Jan. 30, 1923.

B. N. RODDA.
SPRING GATE AND WIPER FOR SEED WHEELS.
FILED DEC. 23, 1920.

1,443,906.

INVENTOR
BERTIE NORMAN RODDA
BY
ATTORNEYS

Patented Jan. 30, 1923.

1,443,906

UNITED STATES PATENT OFFICE.

BERTIE NORMAN RODDA, OF TORRENSVILLE, SOUTH AUSTRALIA, AUSTRALIA.

SPRING GATE AND WIPER FOR SEED WHEELS.

Application filed December 23, 1920. Serial No. 432,749.

*To all whom it may concern:*

Be it known that I, BERTIE NORMAN RODDA, a subject of the King of Great Britain and Ireland, residing at Torrensville, State of South Australia, Commonwealth of Australia, have invented certain new and useful Improvements in Spring Gates and Wipers for Seed Wheels, of which the following is a specification.

This invention has been devised in order to improve the grain feed of a seed drill and cause a positive delivery of the seed or grain from the supply hopper through a smaller and automatically adjustable outlet to the grain funnel or tube, and in particular to ensure the sowing of the grain more evenly.

It may be applied to that well known type of feed mechanism in which a flanged wheel revolves within a somewhat funnel-shaped casing and delivers the grain through an opening in the side thereof. Heretofore the wheel has been formed with a number of cross ribs around the inside of the flange and the grain has been carried thereby through a passage about the lowest part of the wheel and discharged through an opening some little distance beyond the lowest part of the wheel that is at a point where the flange of the wheel has risen to a point where the grain falls off therefrom by gravitation. The outlet is comparatively large and allows the grain at times to be discharged in bunches.

The object of my invention is to make possible the use of a smaller outlet which however shall be capable of automatic adjustment or enlargement when such is required.

According to my invention the grain is delivered from the wheel at about its lowest point, the casing is formed with a release feed outlet, and in front of the outlet is an inclined scraper so fixed as to move the grain outwards and over the edge of the wheel whence it falls into the grain tube.

In order that my invention may be clearly understood I will describe the same with reference to the accompanying drawings in which I have chosen to use for illustrating purposes the wellknown type of grain feed as stated above and in which drawings:—

Figure 1:
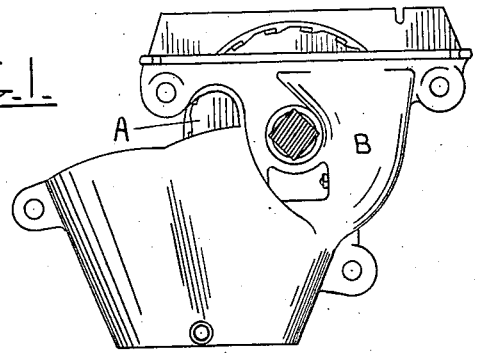
Fig. 1 is an outside view.
Figure 2:
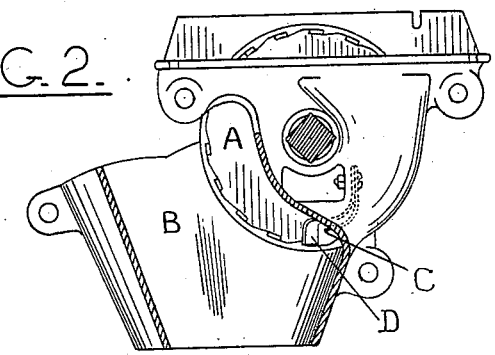
Fig. 2 is a view showing a vertical section of the casing upon a plane just outside of the wheel.
Figure 3:
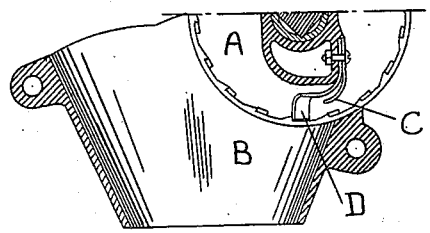
Fig. 3 is a view showing a vertical section of the casing upon a plane just within the rim of the wheel, but showing the wheel in full.

In the drawings A represents the flanged wheel and B the casing. The casing has a release feed outlet having a resilient upper lip C, which is normally approximately stationary but which will release or yield to abnormal pressure and enlarge should the grain tend to jam in the outlet. The outer side of the outlet may also be made with a release device if desired.

In front of the outlet is an inclined scraper D set immediately above the wheel flange, and inclined at an angle so as to move the grain outwards and over the outer edge of the flange, whence it falls into the grain tube.

The grain wheel is made as heretofore with a flange but preferably with the ribs thereon much shallower on the inside than around the outer edge of the flange and set at an angle corresponding with the angle of the scraper.

The grain outlet is so positioned that the grain is delivered from the wheel at about its lowest point. At all times the release feed outlet and the scraper are subject to constructional modifications.

What I claim as my invention is:—

1. In a feeding device for grain drills, a casing having a discharge opening in the side thereof, a feed wheel mounted in the casing, and a spring lip secured to a fixed support within the feed wheel at the discharge end thereof and having its free end spaced from the inner face of the feed wheel, substantially as and for the purpose set forth.

2. In a feeding device for grain drills, a casing having a discharge outlet, a spring lip in the outlet for automatically regulating the size of the same, a feed wheel mounted in the casing, and a scraper secured at one end and having its free end extending in front of the discharge outlet, said scraper being inclined to the wheel and serving to move the grain outward over the wheel and ensure its proper discharge, the lip and scraper having a common point of attachment.

3. In a feeding device for grain drills, the combination with a rotating feed wheel and a casing of an automatically adjustable feed outlet for the feed wheel and an inclined scraper set in front of such outlet to cause a regular and positive delivery of the grain from the feed wheel.

In testimony that I claim the foregoing as my invention I have signed my name in the presence of two subscribing witnesses this 8th day of November, 1920.

BERTIE NORMAN RODDA.

Witnesses:
ARTHUR GORE COLLISON,
KATHLEEN MARY COLLISON.